Figure 1:
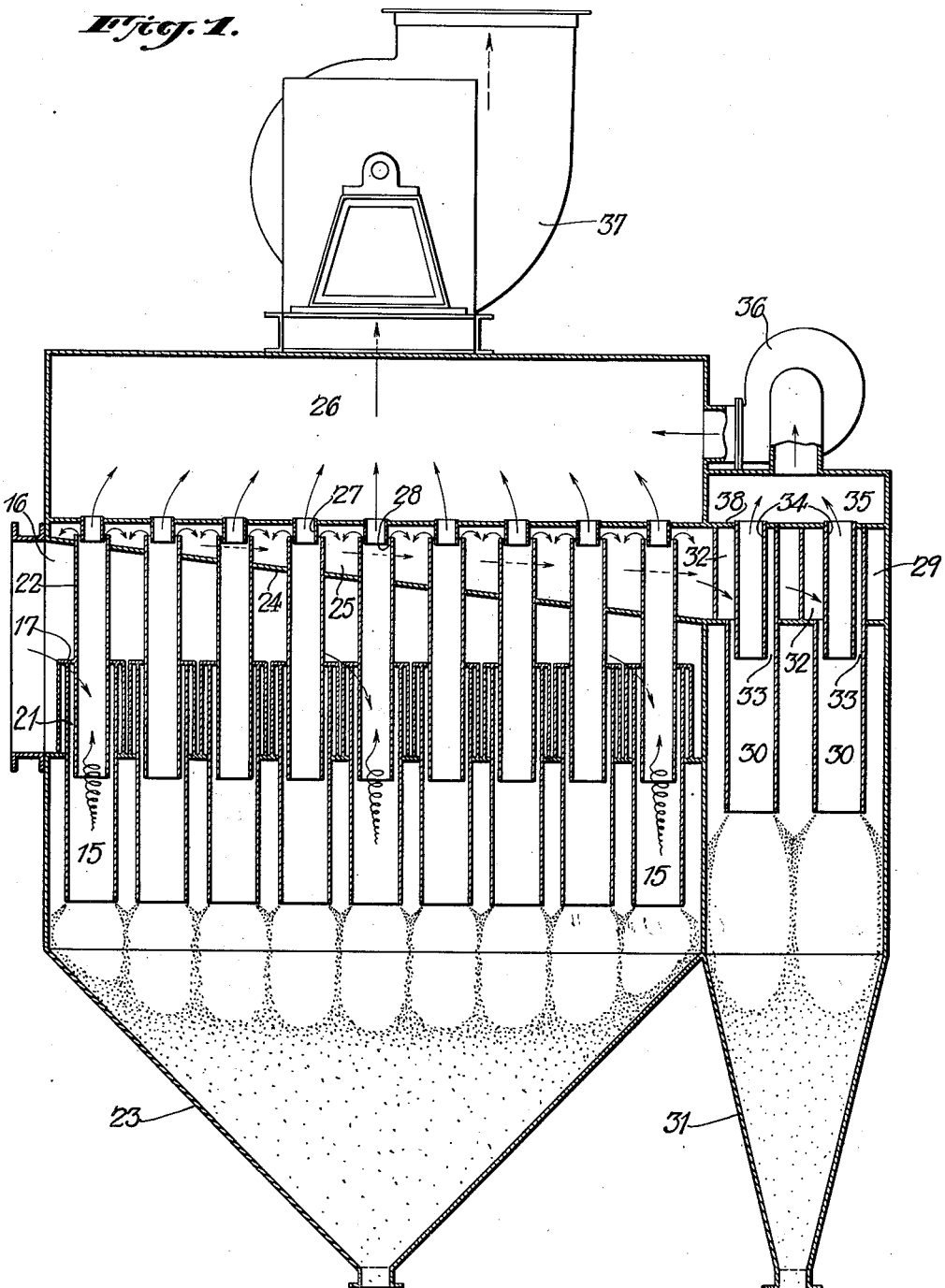

Oct. 17, 1944.   C. B. McBRIDE ET AL   2,360,355
APPARATUS FOR SEPARATING SUSPENDED PARTICLES FROM GASEOUS MEDIA
Filed July 10, 1941   3 Sheets-Sheet 1

INVENTORS
CHARLES B. McBRIDE.
JOHN E. WATSON.
BY Benj. T. Rauber ATTORNEY

Oct. 17, 1944.   C. B. McBRIDE ET AL   2,360,355
APPARATUS FOR SEPARATING SUSPENDED PARTICLES FROM GASEOUS MEDIA
Filed July 10, 1941   3 Sheets-Sheet 2
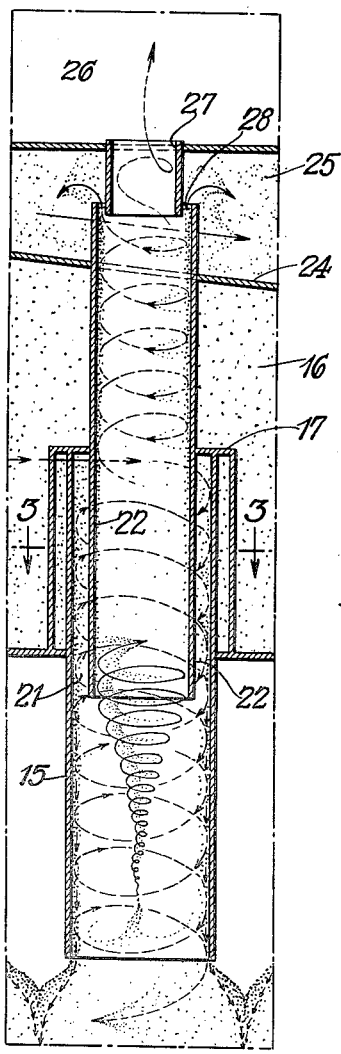
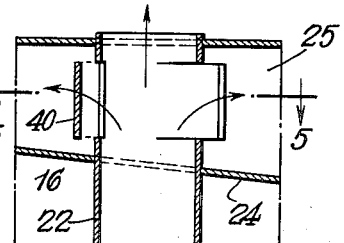
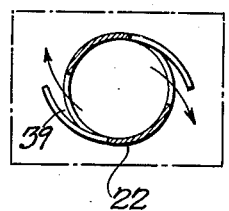
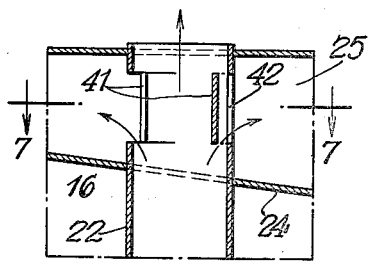
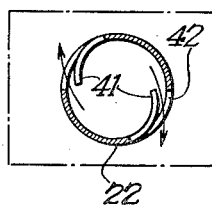
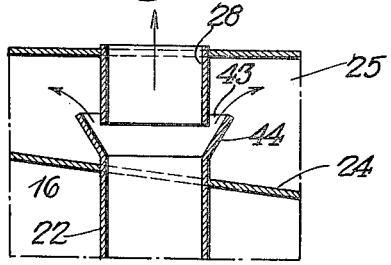
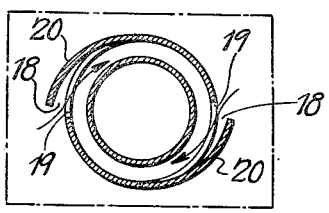
INVENTORS
CHARLES B. McBRIDE.
JOHN E. WATSON.
BY
Benj. T. Rauber ATTORNEYS

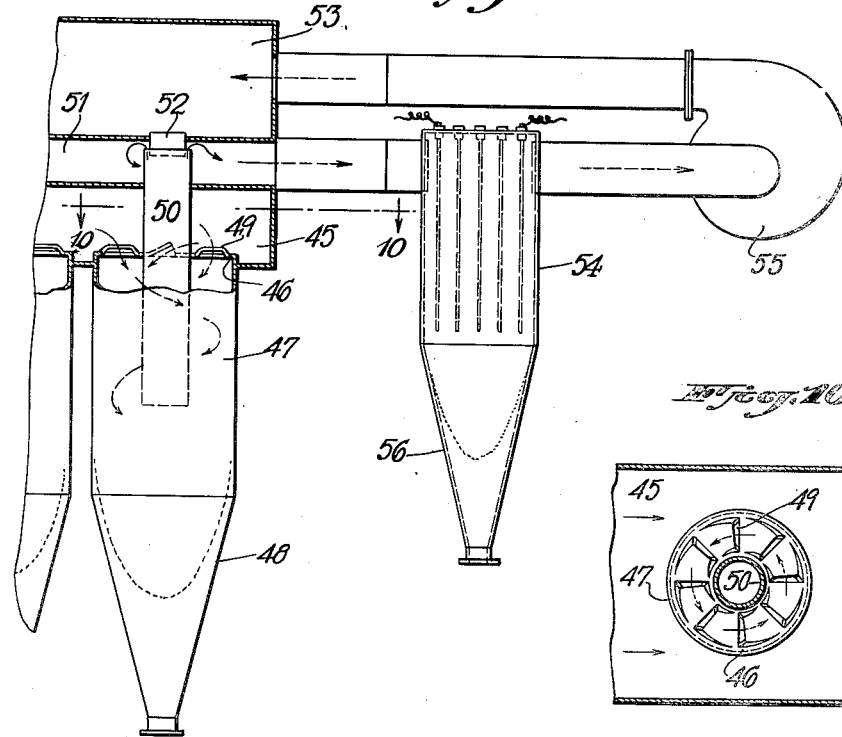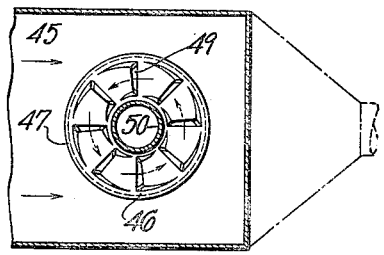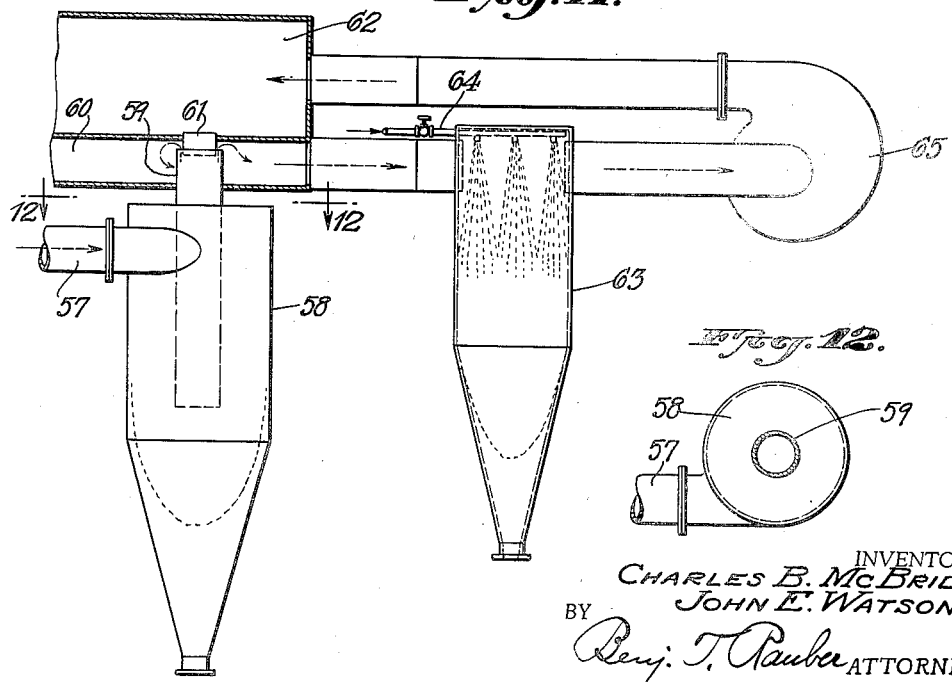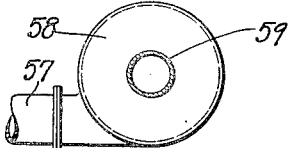

Patented Oct. 17, 1944

2,360,355

UNITED STATES PATENT OFFICE 2,360,355

APPARATUS FOR SEPARATING SUSPENDED PARTICLES FROM GASEOUS MEDIA

Charles B. McBride, Port Chester, N. Y., and John E. Watson, Westport, Conn., assignors to Prat-Daniel Corporation, Port Chester, N. Y., a corporation of New York Application July 10, 1941, Serial No. 401,744

9 Claims. (Cl. 209—144)

Our invention relates to an apparatus for separating suspended particles from air or other gaseous media and more particularly to a method and apparatus in which the suspended particles are first subjected to centrifugal separation to remove a large, or the larger, part of the suspended particles and to segregate the remaining particles in a limited volume of the purified gaseous medium from which they may be separated by any suitable means, either centrifugally or by other mechanical means, or by electric precipitation, or by washing.

In centrifugally separating suspended particles from gaseous media the gas is given a movement of rotation around the inner surface of a centrifugal chamber or tube so as to throw the suspended particles outwardly to the wall of the chamber or tube while the gases are drawn through a central outlet.

For example the gas and suspended particles may be projected tangentially into the tube or chamber and after passing circularly around the inner surface thereof the gas may be withdrawn through a central outlet passing axially from the separating tube or chamber and which may, and preferably does, project into the chamber or tube. By centrifugal action the larger part of the suspended particles, and generally the coarser particles, are thus eliminated from the gas passing outwardly through the axial outlet but the separation is frequently not complete or perfect and some of the lighter particles may be carried with the outgoing or exhaust gases. Inasmuch as these exhaust gases have a whirling motion as they pass through the outlet pipe the suspended particles remaining in these exhaust gases also tend to be thrown outwardly and be contained primarily in a layer or zone of rotating gases immediately adjacent the inner surface of the outlet.

In our present invention this remaining part of the suspended particles is removed from the outgoing or exhaust gases together with the gas in which it is suspended and is then separated in a secondary separation process. In this secondary separation of the particles the volume of gases to be handled is very much smaller than the amount handled in the primary separation inasmuch as only that portion of the gases whirling immediately adjacent the surface of the outlet pipe is involved.

The secondary separation of the suspended particles may be accomplished either centrifugally, by filtering or other mechanical means, by electric precipitation, or by washing, and inasmuch as the volume of gases and the quantity of suspended particles are both much reduced, the separation may be made very effectively even though the suspended particles are very fine.

The various features of the invention are illustrated, by way of example, in the accompanying drawings in which—

Fig. 1 is a sectional view taken through the axes of tubular centrifugal separators and showing the relation between the primary and secondary centrifugal separators. Fig. 2 is a similar view on an enlarged scale of one of the separators and showing the path of the gases and suspended particles. Fig. 3 is a cross-section taken on the line 3—3 of Fig. 2. Figs. 4 and 5 are respectively longitudinal and cross-sectional views, the latter on line 5—5 of Fig. 4, of a modification of certain details of the apparatus. Figs. 6 and 7 are respectively longitudinal and cross-sectional views, the latter on line 7—7 of Fig. 6, of another modification. Fig. 8 is a vertical section of still another modification of part of the apparatus. Fig. 9 is a part sectional elevation of another modification of the apparatus. Fig. 10 is a plan on the line 10—10 of Fig. 9. Fig. 11 is an elevation partly in section of still another modification Fig. 12 is a cross-sectional view taken on line 12—12 of Fig. 11.

In Fig. 1 the apparatus is illustrated as embedded in a centrifugal separator having a number of tubular separating elements 15 supplied from a plenum chamber 16 into which the upper ends of the tubes 15 extend or project. The tubes 15 may be positioned vertically or may be inclined at an angle sufficient to enable the separated particles to roll or drop out of the open ends of the tubes.

In the embodiment shown in Fig. 1, the upper ends of the tubes 15 are closed by a top or enclosure 17 and the air or gas, with its suspended particles, enters the upper part of the tubes 15 through a tangential inlet, Fig. 3, or a pair of tangential inlets 18 formed by an opening, or a pair of diametrically opposite openings, 19 in the wall of the respective tube 15, and a pair of tangentially arranged guide vanes 20 so that air flowing into each tube from the plenum chamber 16 enters with a tangential direction of flow and then passes downwardly with a whirling movement in an annular space or passageway 21 formed between the wall of the tube and an outlet pipe 22 open at its lower end and projecting through the top 17 of the tube. As the gases whirl through the annular space 21 and move downwardly, the suspended particles or dust are thrown outwardly by centrifugal force to the surface of the tube 15 and thence move downwardly to the open end thereof. Here they fall into, and are received in, a hopper chamber 23. This hopper chamber 23 receives only the separated particles, being otherwise preferably airtight.

The gaseous medium upon reaching the lower end of the outlet tube 22 passes upwardly in the latter but still retains its whirling or vortex flow. Consequently as it passes upwardly through the outlet tube 22 any suspended particles still remaining in the medium tend to concentrate in a layer flowing immediately adjacent the inner surface of the tube. The tube 22 extends upwardly through the top 24 of the plenum chamber and into, or through, an intermediate chamber 25 and thence into an exhaust chamber 26. The outlet pipe 22 may extend continuously to the exhaust chamber 26 and be in communication with the intermediate chamber 25 through openings, or it may terminate after entering the chamber 25 and then extend into the chamber 26 by means of short pipes 27 of lesser diameter which extend from the exhaust chamber 26 into the upper parts of the tubes 22 so as to leave a narrow annular passage 28 as shown particularly in Fig. 2.

In the embodiment shown in Figs. 1 and 2, therefore, the main portion of the gases passing upwardly through the outlet pipe 22 pass through the extension 27 into the exhaust chamber 26, but that portion of the gases immediately adjacent the inner surface of the pipe and in which the greater part, or all of the remaining suspended particles are concentrated, passes upwardly through passage 28 into the intermediate chamber 25. The air collected in the intermediate chamber 25 is then subjected to a secondary separation of suspended particles and the gas, or air, freed from the remaining particles by this secondary separation may then be joined to the purified gases in the exhaust chamber 26.

Inasmuch as the volume of air and the quantity of the suspended material received into the intermediate chamber 25 are smaller in amounts than those supplied originally to the plenum chamber, and as the particles are generally more finely divided and more difficult to separate, it may be advantageous to employ other means than centrifugal means as, for example, filters, washing apparatus, or electric precipitation, which would not be economical or practical to apply to the original volume of gases.

However, centrifugal separation may also be used and may be rendered more effective because of the smaller amount of gaseous medium to be handled which makes it easier to obtain higher velocities and increased centrifugal effects.

In the modification shown in Fig. 1, therefore, the intermediate chamber 25 extends into or forms a second plenum chamber 29 through which extend centrifugal separator tubes 30, the lower ends of which open into a second hopper chamber 31. The upper parts of the tubes 30 contained within the secondary plenum chamber 29 have tangential inlets, such as those shown in Fig. 3, through which the secondary gas and suspended particles enter, as at 32, into an annular passage 33 between the wall of the tube 30 and an off-take pipe 34, which leads into a secondary exhaust chamber 35. In the rotation of the gases about the inner surface of the tubes 30 there will be a second separation of suspended particles, this time from a reduced quantity of gas enabling higher efficiencies of separation to be obtained than would otherwise be commercially practicable, due to the fact that high velocities can be used in relatively few tubes without appreciably increasing the overall power required for operating the apparatus.

From the exhaust chamber 35 the purified gases are pumped by centrifugal fans or blowers 36 into the exhaust chamber 26. The fan or blower 36 permits any desired difference in pressure to be created in order to obtain a suitable velocity in the tubes 30. From the exhaust chamber 26 the purified gas may be exhausted through a main exhauster or blower 37.

It will be noted that the tops of the tubes 30 in the secondary exhauster may be closed by a partition 38 between the plenum chamber 29 and the secondary exhaust chamber 35, and that the tubes 34 open directly into the secondary exhaust chamber 35.

In the modification shown in Figs. 4 and 5, the outlet pipe 22 extends directly from the plenum chamber 16 through the intermediate chamber 25 to the exhaust chamber 26. Communication from the inside of the tubes 22 to the intermediate chamber 25 is by means of tangential outlets 39 having outwardly extending wings 40 which permit the outward layer of rotating air or gas to escape or be skimmed through these openings.

The arrangement of the apparatus in the modification shown in Figs. 6 and 7 is similar except that the tangential openings are formed by wings 41 extending inwardly into the tubes 22 and thus skimming the outer layer of rotating air or gas through the outlets 42.

In the modification shown in Fig. 8 the arrangement is similar to that of Fig. 1, except that the extension pipe 28 is, or may be, of the same diameter as that of the outlet pipe 22, an annular opening 43 being formed by an outward flare 44 of the tube 22.

In the embodiment of the invention shown in Fig. 9, the centrifugal separating tubes are different in form and arrangement and are shown as used with an electric precipitator for the secondary separation. It will, of course, be obvious that the electric separator, or washing apparatus of Fig. 11, may be used with the form and arrangement of centrifugal tubes shown in Fig. 1.

In the embodiment of the apparatus shown in Fig. 9, the gases are supplied from a plenum 45 through the top 46 of each of a number of separating cylinders or chambers 47, each or several of which have a hopper 48 in which the separated particles collect and from which they may be removed at intervals. The air or gas is admitted from the plenum chamber 45 into the upper end of the centrifugal chamber 47 by means of radially arranged slots 49 formed by cutting and bending upwardly the top or partition closing the upper ends of the separators 49 from the plenum chamber. The air, therefore, enters this top wall with a downward tangential movement or direction of flow and takes a downward helical path during which the larger part of the suspended material, and generally the coarser particles, are thrown centrifugally outwardly to the inner surface of the separator 49 and thence fall downwardly into the hopper bottoms 48. Purified air or gas passes axially or centrally upwardly through an outlet pipe 50 which may or may not extend into tube 47 into an intermediate chamber or passage 51 and thence the main volume of the air flows through an extension pipe 52 into the exhaust chamber 53, this arrangement being the same or similar to that of Fig. 1.

The outermost layer of air or gas passing upwardly through pipe 50 is drawn through the annular opening between pipe 50 and extension pipe 52 and then through an electric precipitator 54 by means of an exhauster blower 55 and returned to the exhaust chamber 53. In the electric precipitator 54 the suspended particles are removed from the air or gas and fall into a receiving hopper 56. Inasmuch as the volume of gas to be handled in the secondary separation is relatively small, as compared with the original volume, a much smaller electric precipitator may be employed, with a consequent decrease in cost of installation.

In the modification shown in Figs. 11 and 12 air or gas laden with the suspended particles is supplied through a pipe 57 tangentially into a centrifugal separator 58. It, therefore, whirls about the inner surface of the separator 58, depositing its suspended particles against the walls thereof and leaves through a central off-take pipe 59 which projects into an intermediate chamber 60 and is extended by a smaller telescoping pipe 61 into the exhaust chamber 62. While the main volume of air passes through the off-take pipe 59, then through the extension 61 to the chamber 62, the part whirling against the inner surface of the pipe 59, and carrying with it all or part of the suspended particles not deposited in the separator 58, passes between pipes 59 and 61 into the intermediate chamber 60 and is then drawn through a washing chamber 63 where the gases are washed with jets of water or solution 64 to remove the suspended particles, after which the gases are drawn by means of an exhauster blower 65 and returned to the exhaust chamber 62.

It will be understood that the washing apparatus may be used with an arrangement of centrifugal separators, such as shown in Figs. 1 and 9, as well as that shown in Fig. 11. Inasmuch as the volume of gases handled in the washing apparatus is much smaller than the amount originally supplied to the apparatus and as a smaller amount of water is required, the problems of corrosion and of the handling of the water are greatly reduced as compared with the problem of washing the entire quantity of gas to be treated.

Through the above invention, therefore, we have provided an apparatus in which a large quantity of gas may be handled in such a way as to obtain the advantages of centrifugal separation, namely of an effective, rapid and inexpensive separation of the major part of the suspended particles together with a further treatment of a part of the gases under more effective conditions either centrifugally, mechanically or electrically to remove the remaining or substantially remaining suspended particles.

What we claim is:

1. Apparatus for separating suspended particles from gases which comprises a plenum chamber, an exhaust chamber and an intermediate chamber between said plenum chamber and said exhaust chamber, a plurality of centrifugal separators extending into said plenum chamber and each having tangential inlets to receive gas from said plenum chamber, each said centrifugal separator having an axially positioned open ended off-take pipe extending from said centrifugal separator into said intermediate chamber and thence into said exhaust chamber, said off-take pipes having openings into said intermediate chamber to separate gases immediately adjacent the wall of said off-take pipes from the gases centrally thereof and removing them into said intermediate chamber and a secondary separating means for separating suspended particles from gases and means for passing gases from said intermediate chamber through said secondary separator.

2. The apparatus of claim 1 in which said off-take pipe is separated in said secondary chamber and reduced in diameter to form an annular passage.

3. The apparatus of claim 1 in which said off-take pipe has tangential openings in said intermediate chamber to permit the escape of layers of gases immediately adjacent the inner surface of said off-take pipes.

4. The apparatus of claim 1 in which said secondary separator is a centrifugal separator.

5. The apparatus of claim 1 in which said secondary separator is an electric precipitation separator.

6. The apparatus of claim 1 in which said secondary separator comprises means for washing the gases passed therethrough.

7. The apparatus of claim 1 having a common hopper chamber into which the ends of said centrifugal separators discharge.

8. Apparatus for separating suspended particles from gases which comprises a plenum chamber, cylindrical centrifugal tubes having a closed end in said chamber and an open end outside thereof, and having tangentially directed inlets from said plenum chamber, an off-take pipe for each said tube extending into said tube to form an annular space into which said tangential inlets deliver and open at its inner end to receive gases and means to withdraw gases from immediately adjacent the surface of said off-take pipe while permitting gases centrally thereof to pass therethrough and means to separate suspended particles from said withdrawn gases.

9. Apparatus for separating suspended particles from gases which comprises a plenum chamber, cylindrical centrifugal tubes in said chamber having tangentially directed inlets from said plenum chamber, an off-take pipe for each said tube extending into said tube to form an annular space into which said tangential inlets deliver and open at its inner end to receive gases and means to withdraw gases from immediately adjacent the surface of said off-take pipe while permitting gases centrally thereof to pass therethrough and means to separate suspended particles from said withdrawn gases.

CHARLES B. McBRIDE.
JOHN E. WATSON.